Aug. 23, 1960 C. D. MacCRACKEN ET AL 2,949,679
LAUNDRY MACHINE WITH HEAT STORAGE MEANS
Filed May 9, 1957 3 Sheets-Sheet 3
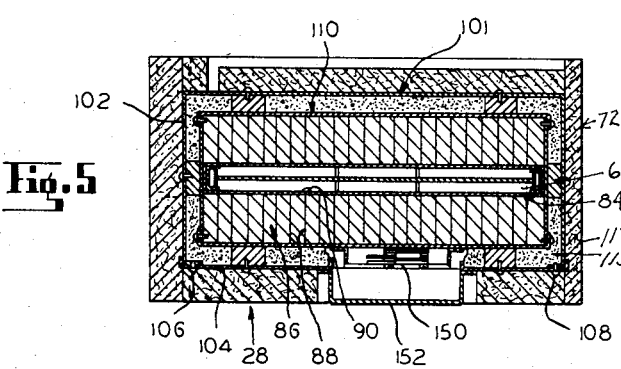
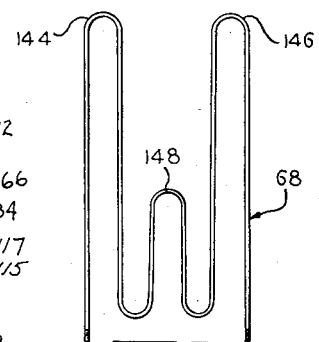
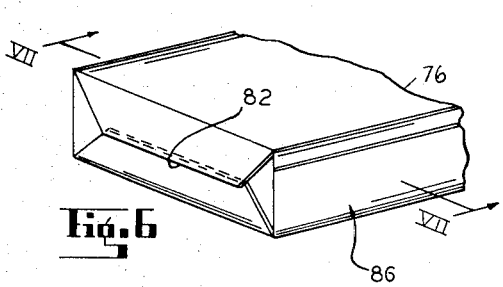
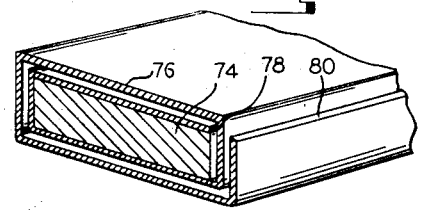
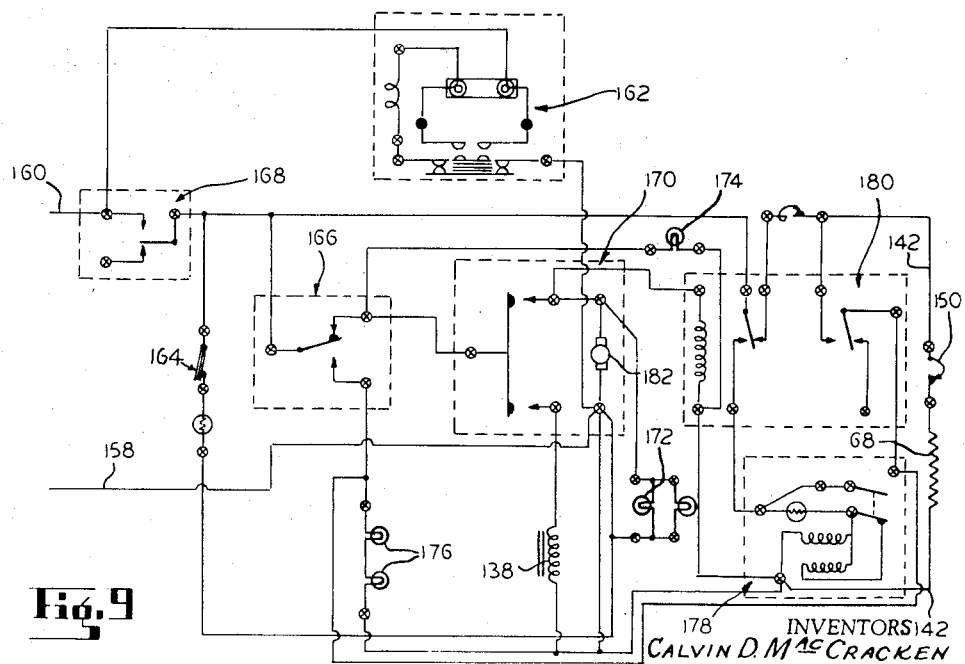
INVENTORS
CALVIN D. MacCRACKEN
GEORGE N. MILES
BY
ATTORNEYS United States Patent Office 2,949,679
Patented Aug. 23, 1960

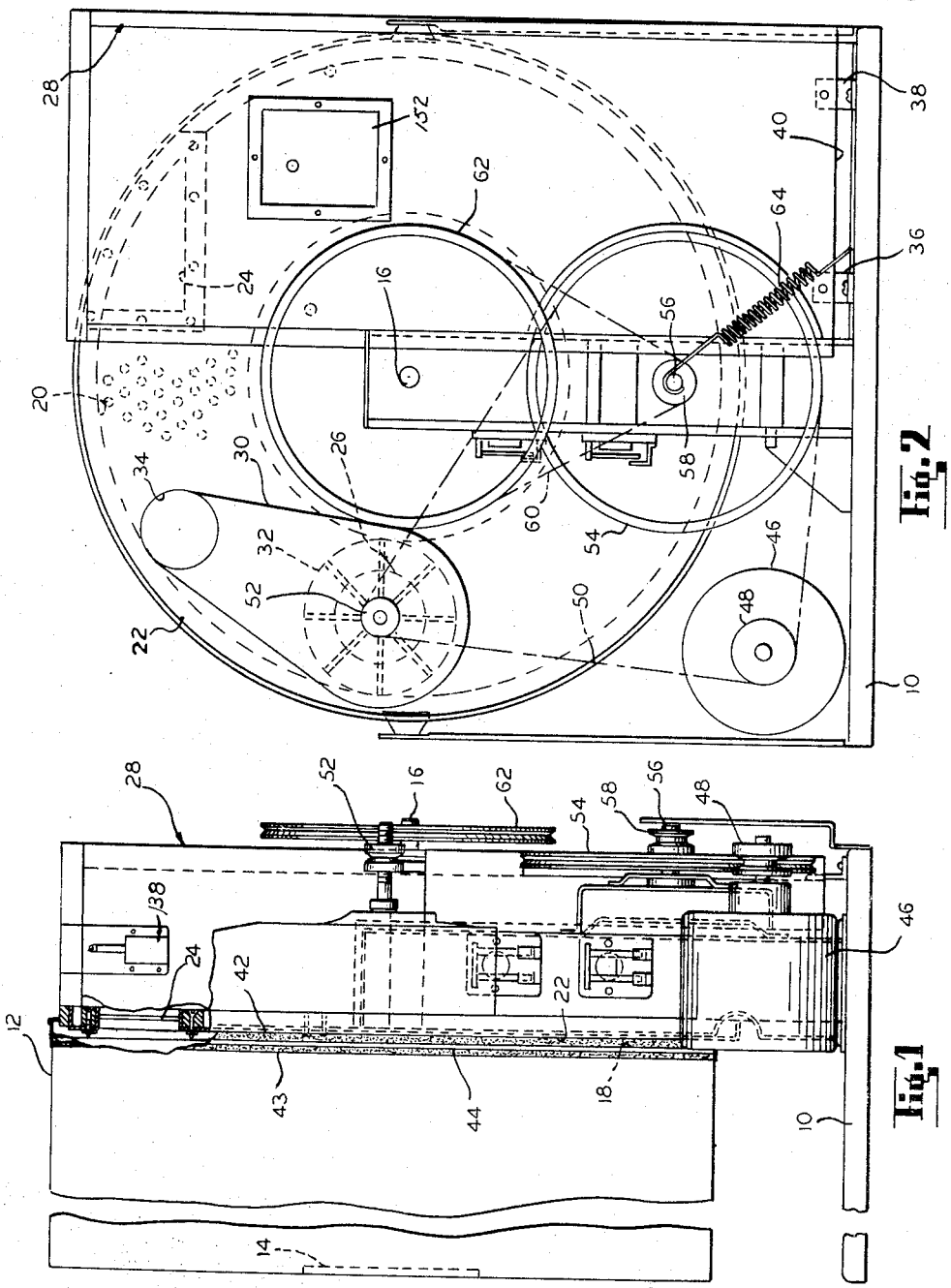

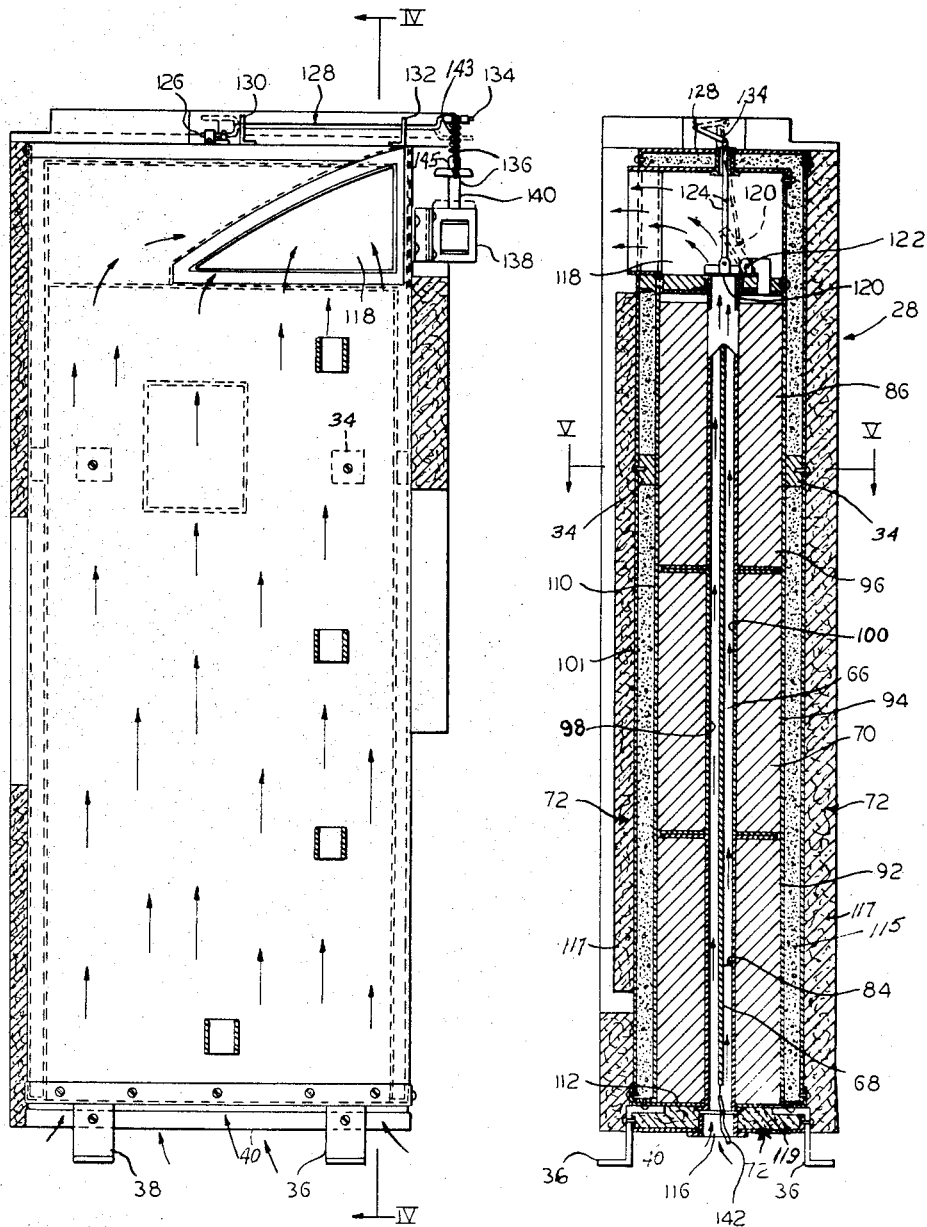

2,949,679

LAUNDRY MACHINE WITH HEAT STORAGE MEANS

Calvin D. MacCracken and George N. Miles, Tenafly, N.J., assignors to Whirlpool Corporation, St. Joseph, Mich., a corporation of Delaware Filed May 9, 1957, Ser. No. 658,157

2 Claims. (Cl. 34—133)

The present invention relates to improvements in heat storage and transfer units which are operative to store heat over non-usage periods for the subsequent controlled release of heat during a usage period in order to require a low consumption of the electrical energy over an extended period of time. The invention especially relates to a method and apparatus for heat storage for a domestic type clothes drier which permits using a 115 volt two-wire electrical system and utilizes a heat storage apparatus which accumulates and stores heat during a storage period and transfers the heat to drying air during an operational period for drying a clothes load in a short operational time that is directly comparable to the time required by a drier supplied with a 230 volt electrical three-wire system.

In home laundry systems, it is expedient to provide a clothes drier which can operate rapidly and complete drying of a load of clothes over a minimum of time. This is important for an effective and successful drying operation and is highly desirable in order that the drier may not fall too far behind the operation of an automatic washer from which the clothes are transferred to the drier. In electrically operated clothes driers this requires a high rate of electrical power supply and it has been found that unless electrical energy is supplied from a 230 volt three-wire system to a heater using in the neighborhood of a 4200 watt input, there is insufficient electrical energy available to provide the heat requirements. A two-wire 115 volt electrical system supplying in the neighborhood of 1650 watts, for example, is insufficient to rapidly dry the clothes in a satisfactory manner. To make rapid drying possible in homes where only a 115 volt two-wire system is available, the present invention contemplates the provision of a heat storage unit which can be supplied with electrical energy during a storage period before the drying operation, and which will yield its heat in a very short time interval during the drying operation to obtain a fast drying of clothes which will approach the speed of drying possible with a 230 volt system.

An object of the present invention, therefore, is the provision of features which will cooperate to provide a heat storage and transfer unit especially suitable for use in a domestic clothes drier which is capable of storing a maximum amount of heat energy during a storage period and which will yield its heat to a circulated heat transfer fluid, such as air, over a relatively short period of time such as required for the rapid drying of clothes but which will still operate within safe operating temperatures.

Another object of the invention is to provide a heat storage unit which is capable of improved efficiency and which is more effective for the purposes required, and which is of simplified, reliable, inexpensive construction.

Another object of the invention is to provide a heat storage and transfer system which is especially well suited to use with a domestic type clothes drier and which will meet the demands and requirements of such a drier.

Another object is to provide an improved structural relationship between a heat storage unit and a fluid flow conduit for the improved transfer of heat from a heating element for a storage period and for the improved transfer of heat from the storage element to the heat transfer fluid during a heat transfer period.

A still further object of the invention is to provide an improved structure utilizing a dimorphic crystalline solid such as an anhydrous sodium sulphate for a heat storage element.

A further object of the invention is to provide an improved domestic type clothes driver utilizing a heat storage unit and a control system for automatically operating the drier wherein the heat storage means is effectively heated during a storage period and wherein the heating means effectively contributes to the increase in temperature of the drying air during a heat transfer period.

Other objects and advantages will become more apparent in connection with the teachings of the features and principle of the invention in connection with the disclosure of the preferred embodiments thereof in the specification and claims and drawings in which:

Figure 1 is a side elevational view of a clothes drier employing the heat storage unit of the present invention with the enclosing cabinet removed from the drier and certain parts broken away to better illustrate the interior construction;

Figure 2 is a rear elevational view of the drier with the cabinet removed to illustrate the relative location of the operating means for the drier and the heat storage unit;

Figure 3 is a front elevational view of the heat storage unit of the present invention;

Figure 4 is a vertical sectional view taken along the line IV—IV of the heat storage unit of Figure 3;

Figure 5 is a horizontal sectional view taken along line V—V of Figure 4;

Figure 6 is a perspective view illustrating an individually wrapped heat storage block;

Figure 7 is a sectional view taken along the line VII—VII of Figure 6;

Figure 8 is a front elevational view illustrating an arrangement of the heating element for the heat storage unit; and Figure 9 is a circuit diagram illustrating an electrical circuit used for automatically controlling the drier and heat storage unit.

Figures 1 and 2 illustrate an automatic domestic clothes drier in combination with a heat storage unit and Figure 9 illustrates a circuit diagram for controlling the heat storage unit and clothes drier. Figures 3, 4, 6, 7 and 8 illustrate features of the heat storage unit, but it is to be understood that while the features illustrated present the preferred embodiment of the invention and illustrate the features thereof in an environment in which they are particularly useful, the features of the invention may be utilized in other arrangements taking advantage of the inherent advantages thereof.

Figures 1 and 2 illustrate a clothes drier with the operating mechanism mounted on a base 10 to which a cabinet is normally attached but it will be understood that the cabinet has been removed for purposes of clearly illustrating the operating elements.

The clothes to be dried are placed in a drier drum 12 which has an access opening 14 at the front. The drum 12 is mounted for suitable rotation about a central axis and may be mounted in a cantilever fashion for rotation on a supporting shaft 16 which projects from the rear wall 18 of the drum. The rear wall 18 is imperforate except for an annular perforated area 20, the location of which is indicated in Figure 2. Directly behind and in close adjacency with the rear wall 18 of the drier drum is an imperforate bulkhead 22. This bulkhead has an opening at 24 for the intake of air into the drier drum and an opening at 26 for the discharge of air after it has picked up moisture from the clothes. The intake opening 24 communicates with a duct extending through the heat storage unit 28 and the discharge opening 26 leads into the fan scroll 30 which houses the fan 32 for drawing air through the entire air circulation system of the drier.

The fan scroll 30 has a discharge opening 34 which leads through an opening in the cabinet, which is not shown, to discharge the moisture laden air into the atmosphere. Intake of the air, which passes through the heat storage mechanism 28, enters through openings in the cabinet wall, and in the present arrangement the heat storage unit 28 is supported on brackets, such as shown at 36 and 38, to space the bottom 40 of the heat storage unit 28 from the base 10 for the entrance of air. Thus, the air completes its circulation from the entrance 40 of the heat storage unit 28 into the opening 24 at the back of the drier drum 12, through the drier drum, out through the opening 26 into the fan scroll 30 and out of the fan scroll discharge opening 34.

To insure that the air flow follows the aforementioned path, the drier drum 12 carries an annular felt band 42 which is held to the drier drum by a metal band 44. The annular felt band meets the imperforate bulkhead 22 in telescoping relationship to prevent the leakage of air.

The drive for the fan and for rotation of the drier drum 12 is obtained from an electric motor 46, which is suitably mounted on the base 10. The motor carries a drive pulley 48 over which is threaded a drive belt 50 that passes over the fan drive pulley 52 and a large pulley 54 on an idler shaft 56.

The idler shaft carries a small speed reduction pulley 58 over which is threaded a drum rotating belt 60. The drum rotating belt passes over a drum pulley 62 which is mounted on the drum supporting shaft 16. The drum supporting shaft is suitably mounted in bearings for carrying the drum 12 in a cantilever fashion and the bearings are supported by suitable brackets extending from the base 10. A tension spring 64 extends between the base 10 and the shaft 56 to maintain tension on the belts 50 and 60.

As may be viewed in Figures 3, 4 and 5, the heat storage and transfer unit 28 is comprised primarily of a conduit 66 with a heat element 68 therein and a heat storage means 70 surrounding the conduit. Outside of the heat storage means is insulation means 72. Each of these elements will be described in detail.

The heat storage material 70 is preferably a medium which has the form of a crystalline solid and which is dimorphic. That is, the crystalline solid changes from one crystalline to another with the application of heat. Preferably, the heat storage means has a transition temperature between 300° and 550° F. and has a relatively high heat of transition. At this operating temperature, the heat storage material is well suited to use with a clothes drier inasmuch as the temperature of the air passing through the conduit or duct 66 will not be overheated so as to burn the clothes and yet there will be a relatively rapid transfer of heat and the air will be heated to a temperature at which rapid drying is achieved. The heat storage substance, which is preferably used in the present invention and which meets the requirements discussed above, is anhydrous sodium sulphate which may be used either in itself or be modified by the addition of other salts. This salt can be converted by heating from the rhombic crystal form to a hexagonal form and this change requires about 85 B.t.u. per pound. This heat of transformation or heat of transition is released when the crystals are cooled and change from the hexagonal back to the rhombic form. Since this change occurs below 500° F., the heat stored between 200 and 500° F. by anhydrous sodium sulphate is in excess of 145 B.t.u. per pound, as compared with a heat storage of 63 B.t.u. per pound by sensible heat alone.

The transition temperature of sodium sulphate when used alone is between 460° and 470° F. Variations in the temperature at which to store and release the major part of the heat can be effected by mixing with small amounts of other anhydrous salts.

The chemical salt heat storage blocks, which may be of anhydrous sodium sulphate or other suitable salts, are preformed by being compressed into briquettes by a conventional hydraulic press or other means. The blocks, which are then in solid form, are further prepared by wrapping each with a thin metal foil such as aluminum foil.

The outer foil wrapper encompasses the chemical salt block by means of the packaging type end fold as illustrated in detail in Figures 6 and 7. In these figures, the compressed salt block 74 is wrapped with the thin metallic foil 76. The foil is illustrated as being wrapped with an encircling motion longitudinally of the pressed block with the starting edge of the foil shown at 78 and the finishing edge at 80. The end folds are then formed in an overlapping manner as shown at 82.

It will be understood that this type of wrap is not restrictive and other types of sealing, such as a crimp lock method, may be used. The foil wrapper, however, prevents crumbling or chipping of the salt block, and also substantially improves the heat transfer characteristics of the storage element.

The individual foil wrapped blocks are then stacked so as to be in contact with the conduit means 84 which defines the duct 66.

As illustrated in Figure 5, the blocks 86 are stacked with their flat faces 88 in side by side relationship and with their edges 90 against the duct 84. As illustrated in Figure 4, the blocks 86 are stacked in rows with the rows placed on top of each other, the lower row being shown at 92, the row above it at 94 and the top row at 96. Rows are provided against each of the walls 98 and 100 of the conduit or duct 66.

The stacked heat storage blocks are surrounded by an insulating housing. As illustrated in Figure 5, the framework for the insulation housing is provided by a rectangular U-shaped sheet metal outer casing 101 and a rectangular shaped inner casing 110. The inner casing includes a channel shaped member 102 and a cover 104. The U-shaped member and the cover member are joined to each other by sheet metal screws 106 and 108.

Spaced inwardly from the outer casing 101 is the inner casing 110, which, as shown in Figures 4 and 5, is fabricated from walls formed of sheet metal and attached at their edges by sheet metal screws. Both the outer casing 101 and inner casing 110 are secured to a base member 112, as shown in Figure 4. The outer casing 101 and the inner casing 110 are separated by spacing blocks 34 which are positioned at spaced locations between the walls of the outer casing 101 and the inner casing 110. Between these casings is a high temperature resistant granular insulation 115 to lessen the thermal loss during all periods of operation and especially during the standby heat storage periods when the heat storage material is being heated. This, for convenience of reference, is referred to as the "storage period" and the time interval when heat is transferred to a fluid passing through the duct 66 is referred to as the "heat transfer" or "operational" period.

For further insulation, layers of insulation 117 are cemented to the outer surface of the outer casing 101. These sheets of insulation, such as illustrated at 117, are cemented to the outer surface of the insulation casing 101 and aid in preventing heat loss.

The insulation extends completely around the side walls of the heat storage unit as well as on the bottom and the top. At the bottom of the unit an insulation pad 119 is attached to the unit provided with an opening 116 extending across the base of the unit to permit the air to flow upwardly through the duct 66.

At the top of the unit, the duct 66 opens into a larger discharge duct 118 which leads into the clothes drier. The flow of air from the heat transfer duct 66 into the discharge duct 118 is controlled by a damper valve 120. The damper valve is pivoted at 122 to move between an open position where the air can flow upwardly through the heat transfer duct 66 and a closed position wherein the flow of air is prevented. The damper 120 is maintained in a closed position during the heat storage and standby periods so that there will be no unwanted escape of heat. However, when the heat transfer period arrives for operation of the clothes drier, the damper valve 120 is moved to open position for the free flow of air up through the duct 66.

Control of the duct is obtained by a connecting link 124 which is shown with the damper 120 in the closed position in the solid line drawing, and in the open position in the dotted line drawing of Figure 4. The upper end of the connecting link 124 is secured to the offset end 126 of a crank 128. The crank is pivotally supported in brackets 130 and 132 at its ends and the end 134 is operably connected to the core 140 of a solenoid 138 by a link 136. A tension spring 143 is also connected between the end 134 of the crank and an anchoring ear 145 on the solenoid frame so as to rotate the crank 128 in a direction to close the damper valve 120 when the solenoid 138 is deenergized. The solenoid is energized only during the operational periods of the clothes drier and will automatically close to prevent the escape of heat when the electrical circuit is broken to the solenoid coil.

Positioned at a central location in the heat transfer duct 66 and spaced from the metallic foil thereof is the heating element 68. The element is supplied with electrical energy for heating through leads 142 which extend downwardly through the opening 116 at the base to a suitable source of electricity which is controlled by the control mechanism illustrated in Figure 9.

As shown in Figure 8, the heating element 68 is shaped with long loops 144 and 146 which will be positioned at the sides of the duct 66 and with a central loop 148 which will be in the center. This will tend to balance the temperature of the stacks of blocks which form the heat storage material inasmuch as the natural tendency of the heated air within the duct 66, which is closed by the damper valve 120, is to circulate upwardly.

The control for the heating element 68, which will be described later in connection with Figure 9, maintains the heating elements heated for the heat storage period and for the heat transfer period. Thus, during the heat storage period the heat is radiated and conducted through the very thin walls 98 and 100 of the duct to increase the temperature of the heat storage salts and during the heat transfer period when air is flowing upwardly through the duct 66 it will be heated both from the heating element 68 and from the heat storage salts. The heat obtained from the heating element is replenished by the constant flow of electricity thereto and the heat received from the storage salts is obtained from its heat storage properties.

During the heat storage period, the maximum temperature is limited by a thermostat element 150, as shown in Figure 5. The thermostat is located against the outer surface of the heat storage blocks 86 and is contained beneath a removable protective cover 152.

Referring to Figure 9, the circuit diagram is shown and electricity is supplied through the electrical leads 158 and 160. The voltage supply in this case is a 115 volt two-wire circuit such as available in wiring in older homes. Because of the heat storage arrangement, the demand for electrical energy is less inasmuch as it is spread out over a longer period of time. The drying, however, can be accomplished in a short time comparable with that possible with a three-wire 220 volt system wherein a greater amount of electrical energy is available.

The circuit is provided with the usual electrical accessories used in a drier to provide a complete circuit, but which provide no part of the invention. A fluorescent lamp unit is shown at 162. A thermostat arrangement is shown at 164 for the interior of the drier. Also illustrated is a safety door switch 166 operative to break the circuit when the drier door is opened. An on-off switch unit 168 is provided and a time cycle control apparatus is illustrated at 170 for determining the sequential operations of the various operating elements of the drier. Accessory features are also shown such as panel lamps 172, a push-button lamp 174 and drum and ozone lamps 176. The timer control, it will be noted, controls the circuit to the main drive motor 178, and the drive motor and heating element 68 are operated through a relay box 180. Thus, the timer switches, operated by the timer motor 182, which is started at the start of the operation of the machine, operate the heater 68 for the storage period which is adequate to bring the storage salts to the proper temperature. The drier is then operated with air being circulated through the heat transfer duct 66, and through the drier drum. The heating element 68 remains on during this period so as to increase the capacity of the drier. A heater element is provided that will operate in the safe power consumption limits for a 110 volt two-wire system. The properties and amount of storage salts are arranged and chosen to have sufficient heat content to heat the circulating air to a drying temperature which will rapidly dry the clothes and provide air at a proper temperature range for safe and effective drying.

Thus, it will be seen that we have provided an improved heat storage unit which is well suited for use in a clothes drier, but which may be employed in other environments. The apparatus meets the objects and advantages hereinbefore set forth and provides a system wherein a maximum amount of heat may be stored, and wherein the heat will be rapidly released for operation such as clothes drying. One of the features of the invention is the storage of a considerable amount of heat energy at a safe operating temperature which is necessary for the safe drying of clothes avoiding discoloration of the fabrics or the possibility of a conflagration.

We have, in the drawings and specification, presented a detailed disclosure of the prefered embodiments of our invention, but it is to be understood that we do not intend to limit the invention to the specific form disclosed, but intend to cover all modifications, changes and alternative constructions and methods falling within the scope of the principles taught by our invention.

We claim as our invention:

1. A clothes drying assembly for removing moisture from clothes during a drying period and adapted to require a low power consumption during said drying period and comprising a rotary clothes drying drum having an access opening in which the clothes are placed into the drum and having air flow openings therein whereby the drying air may enter the drum and carry off the evaporated moisture and be expelled from the drum, an air flow conduit communicating with the interior of the drum, means for forcing the flow of air through said conduit and into the drum, a heat storage means including a dimorphic heat transfer material positioned in surrounding relationship to the conduit whereby said storage means may be heated during a storage period and transmit heat to the air flowing through the conduit during a heat transfer period, a heating element in said conduit positioned for increasing the temperature of the heat storage means during the storage period and for heating air flowing through the conduit during the heat transfer period, an electrically operated damper in the conduit adapted to be opened during the heat transfer period and be closed during the storage period to prevent the uncontrolled escape of heat, biasing means connected to the damper to close the damper in the absence of an electrical control current, and electrical control means connected to the damper to open the damper during the heat transfer period of operation and to operate the heating elements during the storage period and heat transfer period.

2. A clothes drying assembly for removing moisture from clothes during a drying period and adapted to require a low power consumption during said drying period and comprising, a rotary clothes drying drum having an access opening in which the clothes are placed into the drum, said drum having air flow openings therein whereby the drying air may enter the drum and carry off the evaporated moisture and be expelled from the drum, an air flow conduit communicating with the interior of the drum, means for forcing the flow of air through said condiut and into the drum, a volume of dimorphic heat storage material having a transition temperature between 300° and 350° F. positioned in heat transferring relationship with said conduit, a heating element positioned to increase the temperature of the heat storage material and to increase the temperature of the air flowing through the conduit during a heat transfer period, an electrical circuit supplying electricity to said heating element, and a thermostatic means electrically connected to the circuit in controlling relationship and in operative relationship with the heat storage means and operative to limit the maximum temperature of the heat storage means whereby the temperature of the air passing through the conduit does not exceed a maximum limit to damage the clothes within the drier drum.

References Cited in the file of this patent

UNITED STATES PATENTS

| | | |
|---|---|---|
| 1,054,409 | Harrison et al. | Feb. 25, 1913 |
| 2,494,035 | Christy | Jan. 10, 1950 |
| 2,553,581 | Hatfield | May 22, 1951 |
| 2,619,737 | Geldhof et al. | Dec. 2, 1952 |
| 2,808,494 | Telkes | Oct. 1, 1957 |